United States Patent
Aceves et al.

(10) Patent No.: US 11,181,236 B2
(45) Date of Patent: Nov. 23, 2021

(54) VACUUM MANUFACTURE OF CRYOGENIC PRESSURE VESSELS FOR HYDROGEN STORAGE

(71) Applicants: Lawrence Livermore National Security, LLC, Livermore, CA (US); FORD MOTOR COMPANY, Dearborn, MI (US); Klaus Szoucsek, Munich (DE)

(72) Inventors: Salvador Aceves, Livermore, CA (US); John Elmer, Danville, CA (US); Francisco Espinosa-Loza, Livermore, CA (US); Guillaume Petitpas, Livermore, CA (US); James Smith, Livermore, CA (US); Michael Veenstra, Dearborn, MI (US); Klaus Szoucsek, Munich (DE)

(73) Assignees: Lawrence Livermore National Security, LLC, Livermore, CA (US); Ford Motor Company, Dearborn, MI (US)

( * ) Notice: Subject to any disclaimer, the term of this patent is extended or adjusted under 35 U.S.C. 154(b) by 60 days.

(21) Appl. No.: 16/642,684

(22) PCT Filed: Aug. 27, 2018

(86) PCT No.: PCT/US2018/048053
§ 371 (c)(1),
(2) Date: Feb. 27, 2020

(87) PCT Pub. No.: WO2019/046145
PCT Pub. Date: Mar. 7, 2019

(65) Prior Publication Data
US 2020/0200326 A1    Jun. 25, 2020

Related U.S. Application Data

(60) Provisional application No. 62/551,003, filed on Aug. 28, 2017.

(51) Int. Cl.
F17C 13/00    (2006.01)

(52) U.S. Cl.
CPC .... F17C 13/001 (2013.01); *F17C 2201/0109* (2013.01); *F17C 2201/035* (2013.01);
(Continued)

(58) Field of Classification Search
CPC ............ F17C 13/001; F17C 2203/0604; F17C 2203/0391; F17C 2223/0161;
(Continued)

(56) References Cited

U.S. PATENT DOCUMENTS

| 3,390,703 | A | * | 7/1968 | Matlow | ................. F16L 59/029 138/114 |
| 5,419,139 | A | * | 5/1995 | Blum | ....................... B32B 7/12 62/45.1 |

(Continued)

FOREIGN PATENT DOCUMENTS

KR    10-2017-0087892 A    7/2017

OTHER PUBLICATIONS

International Search Report and Written Opinion of the International Searching Authority for PCT/US2018/048053, dated Dec. 19, 2018; ISA/KR.

*Primary Examiner* — Stephen J Castellano
(74) *Attorney, Agent, or Firm* — Harness, Dickey & Pierce, P.L.C.

(57) ABSTRACT

In one aspect the present disclosure relates to a method of manufacturing a cryogenic pressure vessel. The method may include providing a metal lined, composite wrapped vessel which has a boss. The method may further include securing an inlet to the boss, and then encapsulating the metal lined, composite wrapped vessel within a metallic layer in a vacuum controlled environment to form an encapsulated inner tank subassembly. The method may further include (Continued)

securing at least one support to an exterior of the encapsulated inner tank subassembly, and within the controlled vacuum environment, applying a metal coating over the encapsulated inner tank subassembly and the at least one support to form a metal coated, encapsulated inner tank subassembly. The method may further include, within the controlled vacuum environment, encapsulating the metal coated, encapsulated inner tank subassembly within a metallic vacuum jacket, which forms the cryogenic pressure vessel.

20 Claims, 3 Drawing Sheets

(52) U.S. Cl.
CPC .............................. *F17C 2203/032* (2013.01); *F17C 2203/0391* (2013.01); *F17C 2203/0604* (2013.01); *F17C 2203/0607* (2013.01); *F17C 2203/0629* (2013.01); *F17C 2203/0643* (2013.01); *F17C 2203/0646* (2013.01); *F17C 2205/018* (2013.01); *F17C 2209/221* (2013.01); *F17C 2209/232* (2013.01); *F17C 2209/234* (2013.01); *F17C 2221/012* (2013.01); *F17C 2223/0161* (2013.01); *F17C 2260/013* (2013.01); *F17C 2270/0105* (2013.01); *F17C 2270/0131* (2013.01); *F17C 2270/0171* (2013.01); *F17C 2270/0176* (2013.01); *F17C 2270/0189* (2013.01)

(58) Field of Classification Search
CPC ........ F17C 2221/012; F17C 2221/2201; F17C 2221/035; F17C 2201/0109; F17C 2205/018; F17C 2203/0629; F17C 2209/232; F17C 2203/032
See application file for complete search history.

(56) References Cited

U.S. PATENT DOCUMENTS

| | | |
|---|---|---|
| 8,807,382 B1 | 8/2014 | Haberbusch et al. |
| 2003/0111473 A1 | 6/2003 | Carter et al. |
| 2005/0139600 A1 | 6/2005 | Harper et al. |
| 2014/0117021 A1 | 5/2014 | Quemerais et al. |
| 2017/0343158 A1 | 11/2017 | Kato et al. |
| 2018/0231182 A1* | 8/2018 | Posselt .................. F17C 13/001 |

* cited by examiner

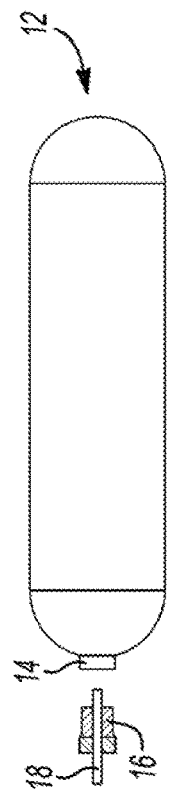
FIGURE 2
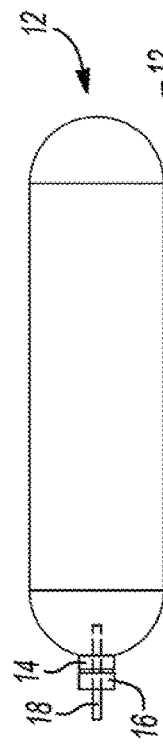
FIGURE 3
FIGURE 4
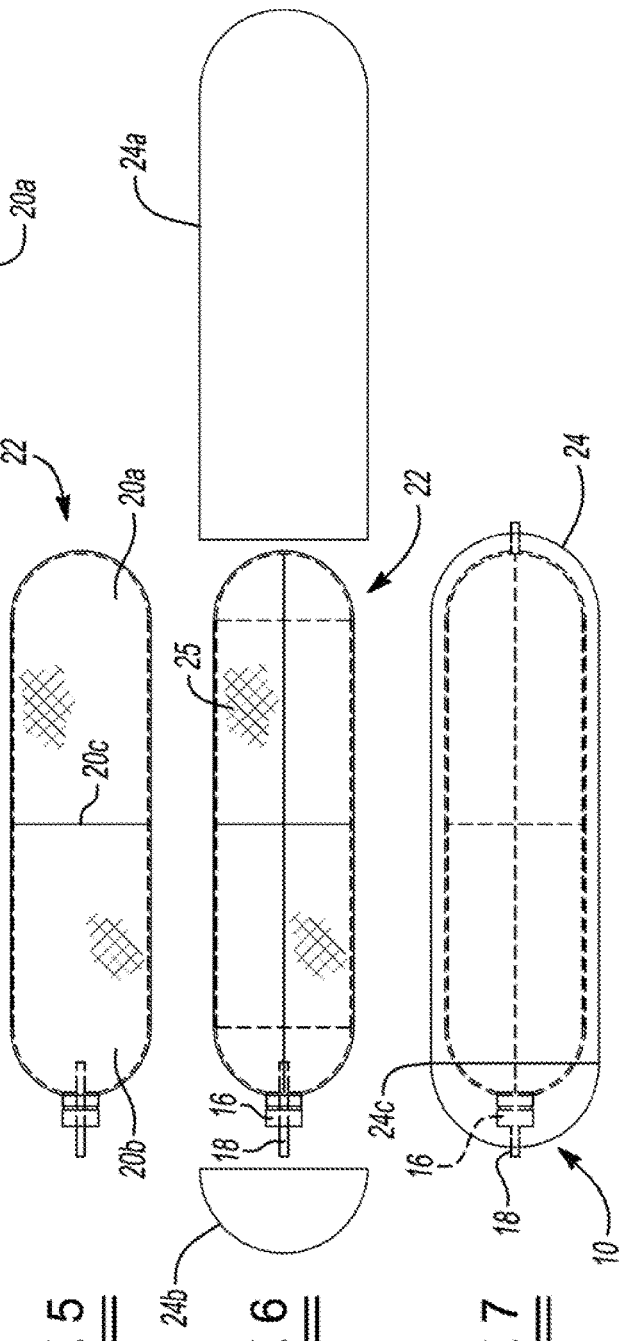
FIGURE 5
FIGURE 6
FIGURE 7

VACUUM MANUFACTURE OF CRYOGENIC PRESSURE VESSELS FOR HYDROGEN STORAGE

CROSS-REFERENCE TO RELATED APPLICATIONS

This application is a U.S. National Phase Application under 35 U.S.C. 371 of International Application No. PCT/US2018/048053, filed Aug. 27, 2018 and published in English as WO 2019/046145A1 on Mar. 7, 2019. This application claims priority to and the benefit under 35 U.S.C. § 119(e) of U.S. Provisional Patent Application No. 62/551,003, filed Aug. 28, 2017 entitled "an optically-based inter-story drift meter system for rapid assessment of the earthquake response of building structures". The entire disclosure of each of the above are incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to methods for manufacturing cryogenic storage vessels, and more particularly to a method for vacuum manufacture of cryogenic pressure vessels which can reduce the time and cost associated with the manufacture of such vessels.

BACKGROUND

This section provides background information related to the present disclosure which is not necessarily prior art.

Hydrogen has the potential to displace petroleum as a universal transportation fuel, thus reducing or eliminating petroleum dependence and associated tailpipe air pollutants and greenhouse gases. The predominant technical barrier limiting widespread use of hydrogen vehicles is sufficient onboard fuel storage capacity for highway vehicles within volume, weight, cost, and refueling time constraints.

Over the past number of years the inventors of the present disclosure have pioneered research and development of a new storage technology: cryogenic pressure vessels (also known as "cryo-compressed vessels"). Traditional cryogenic pressure vessels typically comprise a high-pressure inner vessel typically made of carbon-fiber-coated metal (i.e., Type 3, similar to those typically used to store compressed gas), as well as a vacuum space filled with numerous sheets of highly reflective plastic, and an outer metallic vacuum jacket. This technology can store hydrogen more compactly than conventional ambient temperature pressure vessels, with lower weight than hydrogen absorption storage technologies, and with far greater thermal endurance than conventional, low pressure liquid hydrogen (LH2) storage. This construction potentially eliminates venting losses under virtually all automotive usage conditions. Manufacturing costs are lower due to a smaller container size, which leads to a reduced need for expensive structural materials.

Cryogenic pressure vessels also have compelling safety advantages due to the lower expansion energy of cryogenic hydrogen and the presence of an outer vacuum jacket. The outer vacuum jacket helps protect the internal high-pressure vessel from environmental or mechanical impact.

Traditional operations for manufacturing cryogenic pressure vessels typically comprise the following. Initially, one starts with a commercially available pressure vessel and welds a metallic cap and inlet/outlet tube(s) at the vessel boss. For aluminum lined composite vessels, the metallic cap may be an explosion-bonded, aluminum-stainless steel transition part. The pressure vessel composite overwrap is then encapsulated with a thin metal layer, which is often stainless steel. This enables long-term vacuum stability by physically separating the vacuum space from composite resins, which are well known to be a major outgassing source. This step can be avoided if a metallic pressure vessel (Type 1) is used instead of a composite overwrapped pressure vessel (Type 3). Next, one may incorporate pressure vessel supports. However, pressure vessel supports can be undesirable from the standpoint that they form a heat transfer path into the cryogenic vessel. Nevertheless, they are required for meeting present day crashworthiness requirements for automotive vehicles. Next, the encapsulated vessel may be metal coated. This operation is optional, although it improves thermal insulation performance by providing a very low emissivity layer that may reject much of the incoming radiative heat. Many metals, for example silver, have very low emissivity when cooled to a cryogenic temperature (~0.003); therefore they can reject 99.7% of incident radiative heat, as long as they are perfectly applied, and are undamaged, untarnished and clean.

Next a multilayer insulation (MLI) wrapping may be applied. In theory, this component is unnecessary if the inner vessel is metal coated. However, in actual manufacturing practice, MLI is important due to defects and/or damage to the low emissivity coating. Vessel wrapping may be performed by hand, but robotic installation, or even hand installation of MLI "blankets" made of many layers sewn by thread, may be more appropriate for mass production.

Metal coating of the inner surface of the outer vacuum vessel may then be performed. This is also an optional step that may contribute to improved thermal insulation. However, metal emissivity at ambient temperatures is often on the order of about three times higher than at cryogenic temperature, so this step will have less impact on insulation performance than metal coating the cold encapsulated vessel surface.

Next, the MLI-wrapped vessel may be introduced inside the vacuum vessel, and the vacuum vessel sealed by welding around the inlet and outlet tube. Finally, the vacuum space may be evacuated until pressure reaches a target (at least 0.1 mTorr, 0.01 Pa). This operation is best performed at elevated temperature (which is limited by the composite glass transition temperature of 80-120° C.) to accelerate outgassing in the metallic surfaces and the MLI wrapping.

It will be appreciated that the above described, traditional cryogenic vessel manufacturing process is a long, relatively expensive process. In particular, vacuum pumping to accelerate outgassing of the metallic surfaces and the MLI wrapping may take weeks as gas molecules trapped in between MLI layers slowly find their way toward the vacuum pump. Loss of vacuum quality subsequent to pumping is likely, as surfaces continue outgassing and air trapped in between layers slowly diffuses out. The process can be improved by installing perforated MLI where staggered holes allow gas molecules to better flow toward the pump with little impact on thermal insulation performance. However, long-term pumping is likely still necessary given the relatively low bake temperature, the many layers of MLI necessary to meet insulation targets, and the large surfaces that will generate outgassing during vacuum pumping.

In view of the foregoing, it will be appreciated that new approaches enabling more rapid, inexpensive cryogenic vessel manufacture are necessary for helping promote the widespread implementation and use of hydrogen as a fuel for vehicles.

SUMMARY

This section provides a general summary of the disclosure, and is not a comprehensive disclosure of its full scope or all of its features.

In one aspect the present disclosure relates to a method of manufacturing a cryogenic pressure vessel. The method may comprise providing a metal lined, composite wrapped vessel which has a boss. The method may further include securing an inlet to the boss, and then encapsulating the metal lined, composite wrapped vessel within a metallic layer in a vacuum controlled environment to form an encapsulated inner tank subassembly. The method may further include securing at least one support to an exterior of the encapsulated inner tank subassembly, and within the controlled vacuum environment, applying a metal coating over the encapsulated inner tank subassembly and the at least one support to form a metal coated, encapsulated inner tank subassembly. The method may further include, within the controlled vacuum environment, encapsulating the metal coated, encapsulated inner tank subassembly within a metallic vacuum jacket, which forms the cryogenic pressure vessel.

In another aspect the present disclosure relates to a method of manufacturing a cryogenic pressure vessel. The method may comprise providing a metal lined, composite wrapped vessel which has a boss, and securing an inlet to the boss. The method may further include encapsulating the metal lined, composite wrapped vessel within a metallic layer in a vacuum controlled environment to form an encapsulated inner tank subassembly, and within the controlled vacuum environment, applying a metal coating over the encapsulated inner tank subassembly. The method may further include wrapping a multi-layer insulation (MLI) blanket on the encapsulated inner tank subassembly to form an MLI wrapped inner tank subassembly, and within the controlled vacuum environment, encapsulating the MLI wrapped inner tank subassembly within a metallic vacuum jacket.

In still another aspect the present disclosure relates to a cryogenic pressure vessel. The cryogenic pressure vessel may comprise a metal lined, composite wrapped vessel which has a boss. An inlet may be included which is secured to the boss. The metal lined, composite wrapped vessel may be encapsulated within a metallic layer, within a vacuum controlled environment, to form an encapsulated inner tank subassembly. A metal coating may be included over the encapsulated inner tank subassembly, and a multi-layer insulation (MLI) blanket wrapped over the encapsulated inner tank subassembly to form an MLI wrapped inner tank subassembly. A metallic vacuum jacket may also be included which encapsulates the MLI wrapped inner tank subassembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations are included, and are not intended to limit the scope of the present disclosure. Reference numerals indicate corresponding parts throughout the several views of the drawings.

FIG. 2 illustrates an initial operation in the manufacture of the cryogenic pressure vessel shown in FIG. 1 in which an insert is screwed into a threaded boss at one end of an innermost metal vessel, (or metal lined, composite wrapped vessel);

FIG. 3 illustrates the insert after being welded into the boss of the innermost metal lined, composite wrapped vessel;

FIG. 4 illustrates a pair of thin metal caps that are preferably welded together over the innermost metal lined, composite wrapped vessel of FIG. 3, to thus encapsulate the composite overwrap in a hermetically sealed enclosure;

FIG. 5 shows the subassembly of FIG. 4 with the metal caps welded together;

FIG. 6 shows the subassembly of FIG. 5 with metallic vacuum jacket portions that will be used to fully encapsulate the subassembly of FIG. 5 and any MLI wrapping applied to its exterior for reduced heat transfer;

FIG. 7 shows a cross sectional view of the fully assembly cryogenic pressure vessel.

DETAILED DESCRIPTION

Example embodiments will now be described more fully with reference to the accompanying drawings.

The present disclosure presents a methodology for rapid and inexpensive manufacture of cryogenic pressure vessels. It is generally recognized in the industry that the manufacture of cryogenic pressure vessels involves numerous operations (e.g., composite vessel metal encapsulation, low emissivity metal coating, multilayer insulation installation, e-beam welding, brazing, outgassing at elevated temperature) which either demand a vacuum or are best performed under a controlled vacuum environment. Intermittent exposure to ambient air between these manufacturing operations slows manufacture, increasing cost and vacuum pump energy consumption while simultaneously allowing the possibility of introducing contaminants in the vessel that can negatively impact processing time, as well as insulation performance and vacuum stability. The present disclosure eliminates or significantly reduces these concerns by a methodology of manufacturing cryogenic vessels inside an automated production line operating under a controlled high vacuum environment (e.g., 0.1-0.001 mTorr, 0.01-0.0001 Pa). At these conditions, cryogenic vessel manufacturing operations can be conducted without intermittent exposure to the environment, thereby simultaneously reducing the potential for contamination, vacuum pump power loss, and increases in manufacturing time and cost.

Figure 1:
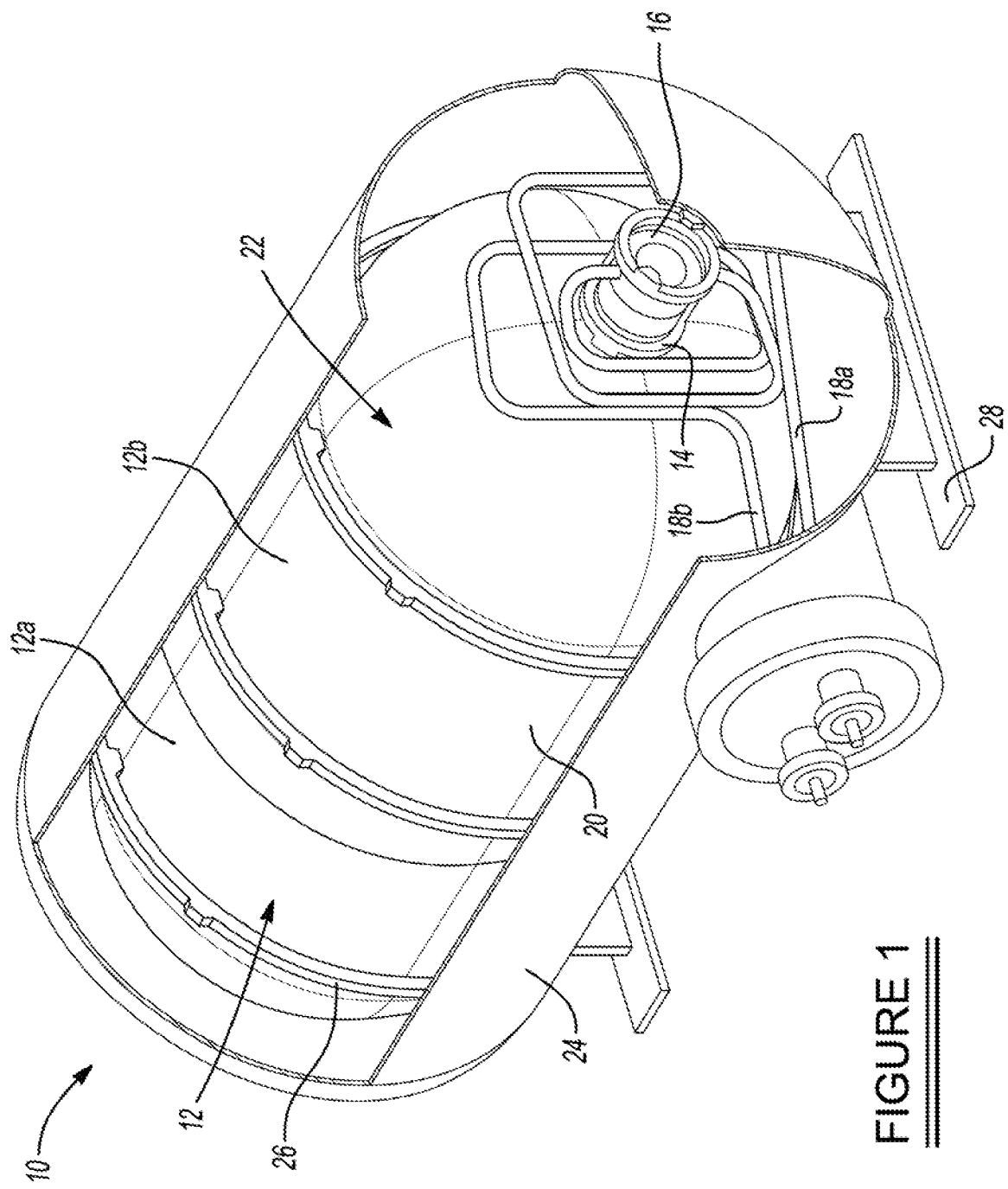
FIG. 1 shows a partial cross section, isometric view of a cryogenic pressure vessel in accordance with one embodiment of the present disclosure.

Referring to FIG. 1 there is shown a cryogenic pressure vessel 10 in accordance with one embodiment of the present disclosure. The vessel 10 in this example may include an innermost metallic tank 12a possibly wrapped with a composite overwrap material layer 12b (i.e., hereinafter simply "composite overwrap" 12b) to form a metal lined, composite wrapped vessel 12. The metal lined, composite wrapped vessel 12 includes a boss portion 14 at one end thereof into which an insert 16 is threadably inserted and welded (also shown in FIGS. 2 and 3). The insert 16 may include a fill tube 18a and a discharge tube 18b that respectively form an inlet line and an outlet line, to enable filling of the vessel 10 with hydrogen, as well as allowing hydrogen to be discharged from the vessel 10.

The vessel 10 in one embodiment may further include a thin metallic encapsulating layer 20. The metallic encapsulating layer 20 may be formed using a metal deposition technique or by joining two separate portions 20a and 20b (shown distinctly in FIG. 4), which in either case fully encloses the composite overwrap 12b to form an encapsulated inner tank subassembly 22. The metallic layer 20 encapsulating composite overwrap material layer 12b, whether formed as a deposited metal layer or from two or more preformed metallic caps or sections, is advantageous, as will be explained further in the following paragraphs, for separating highly outgassing resins used in the composite overwrap material layer 12b from a vacuum space that will be created in a subsequent manufacturing operation.

The encapsulated inner tank subassembly 22 may be silver plated in the outside for reduced emissivity of thermal radiation and then wrapped in multilayer insulation (MLI) for reduced heat transfer.

Finally, a metallic vacuum jacket 24 may be formed over the encapsulated inner tank subassembly 22 and MLI wrapping to form the completed vessel 10. The metallic vacuum jacket 24 further helps to form an internal void within the vessel 10 that helps to thermally insulate the encapsulated inner tank subassembly 22 from ambient heat which the vessel 10 is exposed to. Internal mounts (i.e., support rings) 26 may be used to help support the encapsulated inner tank subassembly 22 within the metallic vacuum jacket 24. External mounting feet 28 may be secured (e.g., by welding, fasteners, etc.) to outer surface portions of the metallic vacuum jacket 24 to enable mounting of the vessel 10 on a flat platform or other mounting structure. Any other suitable mounting structure may alternatively be used to secure the vessel 10, and such structure may depend in whole or in part on the specific type of vehicle that the vessel is implemented in.

While the vessel 10 is shown having a generally round, cylindrical shape, it will also be appreciated that the vessel could be formed in a variety of other cross sectional shapes, for example rectangular, square, etc., and the teachings presented herein are not limited to a vessel having only a round, cylindrical shape.

Referring to FIGS. 2-7 and 8, a description of one methodology for manufacturing the vessel 10 shown in FIG. 1 will be provided. Various components of the vessel 10 are shown in FIGS. 2-7 and a flowchart 100 is presented in FIG. 8 summarizing various operations that may be performed in manufacturing the vessel 10. At operation 102 in FIG. 8 the inlet/discharge tube 18 may be secured, for example by TIG welding or any other suitable means, to the insert 16. This operation may be performed outside of a vacuum controlled environment. This is represented in FIG. 2. If the vessel 10 has the innermost metallic tank 12a made from aluminum, then a bimetallic transition piece (not shown in FIG. 1), partly made from stainless steel and partly from aluminum, may be appropriate to use in the insert 16 to reduce heat transfer through the interior of the insert 16 into the innermost metallic tank 12a by making inlet/discharge tube(s) 18 of stainless steel instead of aluminum. The boss portion 14 often may include an inner threading where the insert is screwed and welded.

At operation 104 the thin metallic encapsulating layer 20 may then be applied to the metal-lined composite wrapped vessel 12. This operation is preferably formed in the high vacuum controlled environment described above, which helps to enable an efficient and clean coating operation to be realized. The metallic encapsulating layer 20 may by applied by using conventional vapor deposition techniques. If two preformed metallic encapsulating sections are utilized, such as sections 20a and 20b in FIGS. 4 and 5, then this operation may involve joining the two sections 20a and 20b by a suitable welding process, such as for example TIG, e-beam or laser welding or any other suitable securing method, within the high vacuum controlled environment. The two portions 20a and 20b (FIG. 4) may be joined along a seam line 20c shown in FIG. 5.

Figure 8:
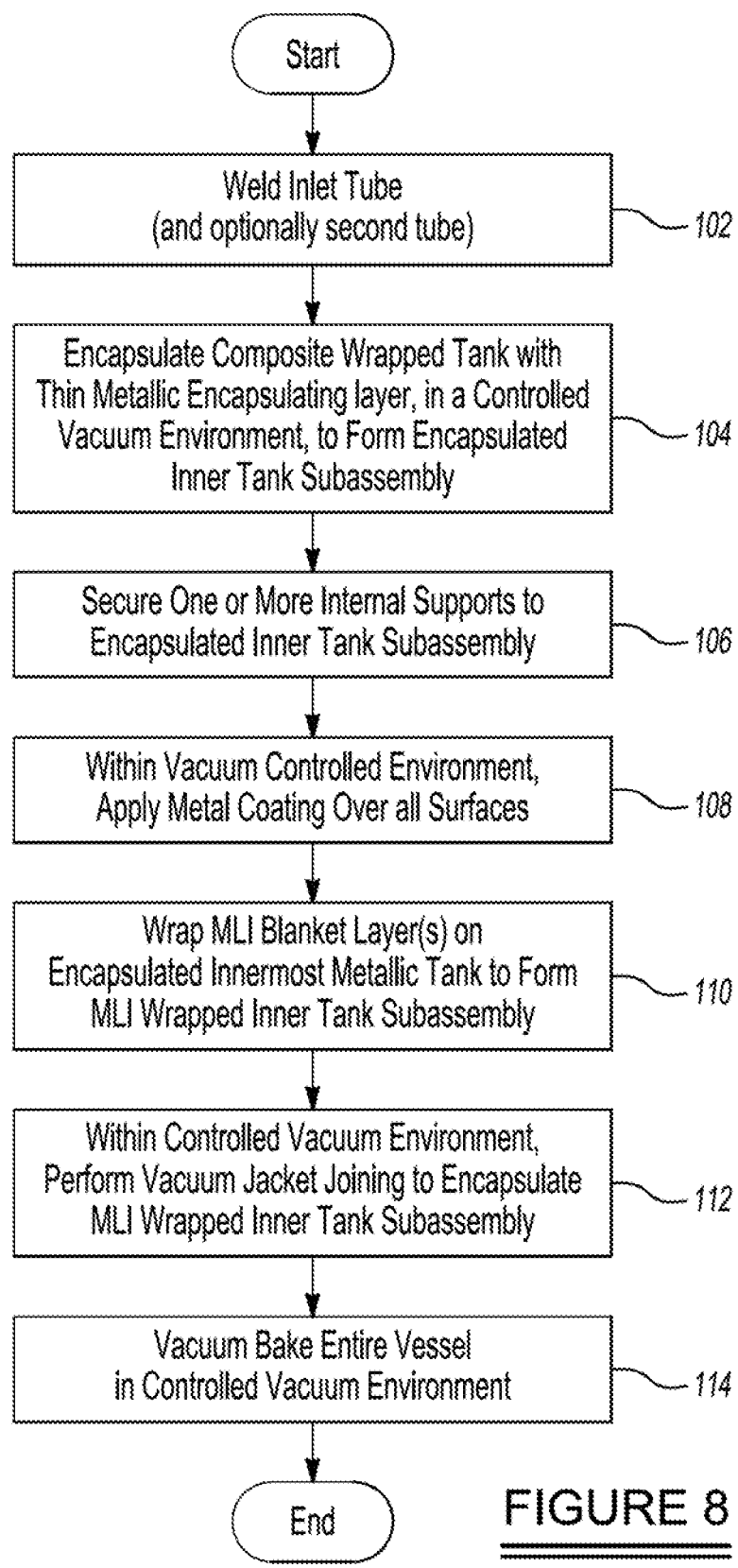
FIG. 8 is a flowchart detailing various operations that may be performed at each manufacturing operation to form the cryogenic pressure vessel of FIG. 1.

Optionally, as indicated at operation 106 in FIG. 8, one or more pressure vessel supports, such as support 26 in FIG. 1, may be attached to the inner tank subassembly 22 before or after it is introduced into a vacuum controlled environment. If the support(s) 26 is being attached through e-beam welding or a brazing operation, then the support(s) would be optimally attached while the inner tank subassembly 22 is in the vacuum controlled environment.

At operation 108 in FIG. 8, the inner tank subassembly 22 may then be coated with a thin metal coating (e.g., silver) in the same or a subsequent production line station. The thin metallic coating may be applied through conventional vacuum deposition techniques that require high vacuum environments (i.e., 0.1-0.001 mTorr, 0.01-0.0001 Pa or less). All surfaces of the inner tank subassembly 22 including the inlet/discharge tube 18, insert 16, boss portion 14, and support(s) 26 (if included) may be uniformly coated with a metallic coating, greatly reducing emissivity. Performing this operation in a high vacuum controlled environment guarantees clean, uncontaminated surfaces that help lead to improved insulation performance and reduced outgassing.

At operation 110, multilayer insulation ("MLI") may then be applied over the just-coated, inner tank subassembly 22 to form an MLI-wrapped inner tank subassembly, in the high vacuum controlled environment (e.g., 0.1-0.001 mTorr, 0.001-0.0001 Pa or less), at the same or a different production station. The MLI layers may be applied by one or more suitable robotic devices, either by attaching pre-sewn MLI blanket layers, or by spinning the inner tank subassembly 22 to wrap the MLI blanket layers thereon, so that the inner tank subassembly 22 is substantially fully wrapped with the MLI blanket layers. Gas trapping between MLI layers is minimized by conducting the wrapping operation within the high vacuum controlled environment.

At operation 112, the metallic vacuum jacket 24 may be assembled over the MLI-wrapped inner tank subassembly. This operation may also be performed inside the high vacuum controlled environment such as described above and may involve e-beam welding or any other suitable welding/ joining technique. However, e-beam welding in the controlled vacuum environment described herein produces minimal impact to the metallic encapsulating layer 20 and MLI due to the small areas that are affected by heating, which is typical of e-beam welding. The metallic encapsulating layer 20 and MLI are thus left as a shiny metal coating that minimizes heat transfer into the composite wrapped tank vessel 12. If the metallic vacuum jacket is initially formed in two or more sections, such as sections 24a and 24b shown in FIGS. 6 and 7, then these two sections may be joined by e-beam welding within the above-described vacuum controlled environment, or through any other suitable joining process.

At operation 114 vacuum baking of the fully assembled vessel 10 is then performed at an elevated temperature, for example between preferably about 80-120 degrees C. for about 12 hours-24 hours. Prior to this baking operation, attachment of the external mounting feet 28 (if included) may be performed by e-beam welding or any other suitable process, and possibly also within the high vacuum controlled environment.

The various subcomponents of the vessel 10 thus reside in a vacuum before installation and can each be individually baked before assembly. This may result in shortening of the time required to bake the various portions of the vessel 10 to a period of hours rather than weeks. Alternatively, this may permit baking of the vessel 10 to be accomplished using lower baking temperatures than would otherwise be needed with a conventional manufacturing technique (i.e., a technique performed substantially outside of a vacuum controlled environment).

The above-described manufacturing process to create the completed vessel 10 provides a number of important and significant advantages over previous manufacturing techniques. Importantly, the various manufacturing operations are conducted under high vacuum, therefore avoiding intermittent exposure to the ambient environment that may introduce contaminants or damage highly sensitive metal coated surfaces. The manufacturing process described herein also reduces vacuum pump power and processing time by eliminating the need for repeatedly regenerating the vacuum around or inside the vessel 10 after exposure to ambient air. Still further, with a conventional fabrication process that is employed outside of a high vacuum controlled environment, the metallic encapsulating layer (the equivalent metallic layer to layer 20 described herein) has to withstand external atmospheric pressure without buckling. In the manufacturing process described herein, the metallic encapsulating layer 20 is never exposed to ambient pressure. Therefore, it can be made thinner without risking buckling failure, thereby reducing impact on system weight and volume.

The manufacturing process described herein may also provide an outer coating for the metallic encapsulating layer 20 which may reach its theoretical insulating performance due to lack of contaminants. With a silver coating with emissivity of about 0.003, heat transfer through vacuum insulation (not including tubes or supports) may drop to about 1.4 W/m$^2$, which is less than what is typically achievable with present day vacuum insulations including about 25 layers of MLI blanket material. Accordingly, the possibility exists that if this performance criterion can be reached, the MLI blanket may even become optional, thereby further reducing cost and further simplifying (and possibly shortening) the assembly, manufacture and baking operations. The internal vacuum spacing of the vessel 10 may potentially also be reduced, thus improving system volumetric hydrogen storage performance. The highly localized heat produced using e-beam welding in a high vacuum controlled environment enables final sealing of the vacuum vessel with minimum damage to low emissivity metal-coated surfaces, thereby further enhancing the possibility of vacuum insulation without the need for MLI blanket.

Lastly, final baking of the assembled vessel 10 is faster due to components having previously resided in a vacuum controlled environment for an extended time. Components may also be individually vacuum baked before assembly, as noted above. The potential to eliminate the MLI blanket layer also may eliminate the challenge of controlling outgassing by avoiding the trapping of gas between MLI blanker layers.

The vessel 10 in its various embodiments is well adapted for use as a cryogenic pressurized storage vessel for use with hydrogen and natural gas powered vehicles. The vessel 10 aids in reducing the system volume and weight of the onboard storage vessel required for storing hydrogen fuel for use by the vehicle. It will be appreciated by those skilled in the art that the vessel 10 is equally applicable with little or no modification to various other applications, for example with hydrogen powered airplanes, unmanned aerial vehicles, submarines, ships, rotorcraft and other watercraft, and any other vehicle that needs compact hydrogen storage with long dormancy. Still further applications may involve buses, trucks, and auxiliary power units for airplanes or military equipment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A cryogenic pressure vessel, comprising:
   a metal lined, composite wrapped vessel, the metal lined, composite wrapped vessel having a boss;
   an inlet secured to the boss;
   the metal lined, composite wrapped vessel being encapsulated within a metallic layer, within a vacuum controlled environment, to form an encapsulated inner tank subassembly;
   a metal coating over the encapsulated inner tank subassembly;
   a multi-layer insulation (MLI) blanket wrapped over the encapsulated inner tank subassembly to form an MLI wrapped inner tank subassembly; and
   a metallic vacuum jacket which encapsulates the MLI wrapped inner tank subassembly.

2. The cryogenic pressure vessel of claim 1, further comprising at least one support secured to the metal lined, composite wrapped vessel.

3. A method of manufacturing a cryogenic pressure vessel, the method comprising:
   providing a metal lined, composite wrapped vessel, the metal lined, composite wrapped vessel having a boss;
   securing an inlet to the boss;
   encapsulating the metal lined, composite wrapped vessel within a metallic layer in a vacuum controlled environment to form an encapsulated inner tank subassembly;
   within the controlled vacuum environment, applying a metal coating over the encapsulated inner tank subassembly;
   wrapping a multi-layer insulation (MLI) blanket on the encapsulated inner tank subassembly to form an MLI wrapped inner tank subassembly; and
   within the controlled vacuum environment, encapsulating the MLI wrapped inner tank subassembly within a metallic vacuum jacket.

4. The method of claim 3, further comprising:
   after the MLI wrapped inner tank subassembly has been encapsulated within the metallic vacuum jacket to form the cryogenic pressure vessel, baking the cryogenic pressure vessel for a predetermined time.

5. The method of claim 3, further comprising securing an inlet tube to the inlet prior to encapsulating the metal lined, composite wrapped vessel with the metallic layer.

6. The method of claim 3, further comprising securing at least one support to the encapsulated inner tank subassembly prior to encapsulating the metal lined, composite vessel with the metallic layer.

7. The method of claim 3, wherein encapsulating the MLI wrapped inner tank subassembly comprises enclosing the MLI wrapped inner tank subassembly within two metallic vacuum jacket sections joined at a seam, within the vacuum controlled environment.

8. The method of claim 7, wherein the seam is joined using one of:
   TIG welding;
   e-beam welding; and
   laser welding.

9. The method of claim 3, wherein encapsulating the metal lined, composite wrapped vessel within the metallic layer comprises forming the metallic layer using a metal deposition technique within the vacuum controlled environment.

10. The method of claim 9, wherein the metallic layer comprises silver.

11. The method of claim 3, wherein encapsulating the MLI wrapped inner tank subassembly within the metallic vacuum jacket comprises forming the metallic layer using two preformed metallic caps which are joined together at a seam.

12. The method of claim 11, further comprising securing the seam of the two preformed metallic caps through a welding operation.

13. A method of manufacturing a cryogenic pressure vessel, the method comprising:
    providing a metal lined, composite wrapped vessel, the metal lined, composite wrapped vessel having a boss;
    securing an inlet to the boss;
    encapsulating the metal lined, composite wrapped vessel within a metallic layer in a vacuum controlled environment to form an encapsulated inner tank subassembly;
    securing at least one support to an exterior of the encapsulated inner tank subassembly;
    within the controlled vacuum environment, applying a metal coating over the encapsulated inner tank subassembly and the at least one support to form a metal coated, encapsulated inner tank subassembly; and
    within the controlled vacuum environment, encapsulating the metal coated, encapsulated inner tank subassembly within a metallic vacuum jacket, which forms the cryogenic pressure vessel.

14. The method of claim 13, further comprising:
    prior to encapsulating the metal coated, encapsulated inner tank subassembly within the metallic vacuum jacket, wrapping a multi-layer insulation (MLI) blanket on the encapsulated inner tank subassembly to form an MLI wrapped inner tank subassembly.

15. The method of claim 13, wherein encapsulating the metal lined, composite wrapped vessel within the metal layer comprises using a metal deposition technique to form the metallic layer.

16. The method of claim 15, wherein the metallic layer comprises silver.

17. The method of claim 13, wherein encapsulating the metal lined, composite wrapped vessel within the metal layer comprises using two separate metallic portions joined at a seam to encapsulate the metal lined, composite wrapped vessel.

18. The method of claim 13, wherein the metallic vacuum jacket is formed by two metallic jacket sections joined at a seam which fully enclose the metal coated, encapsulated inner tank subassembly.

19. The method of claim 14, wherein the MLI wrapped inner tank subassembly is encapsulated within the metallic vacuum jacket.

20. The method of claim 13, further comprising:
once the metal coated, encapsulated inner tank subassembly is encapsulated within the metallic vacuum jacket, then baking the cryogenic pressure vessel for a predetermined time.

\* \* \* \* \*